(12) United States Patent
Tipping et al.

(10) Patent No.: US 8,371,915 B2
(45) Date of Patent: *Feb. 12, 2013

(54) COMPUTING A TARGET SPEED IN A VIRTUAL RACING ENVIRONMENT

(75) Inventors: Michael E. Tipping, Girton (GB); Mark Andrew Hatton, Eye (GB)

(73) Assignee: Microsoft Corporation, Redmond, WA (US)

( * ) Notice: Subject to any disclaimer, the term of this patent is extended or adjusted under 35 U.S.C. 154(b) by 274 days.

This patent is subject to a terminal disclaimer.

(21) Appl. No.: 12/795,215

(22) Filed: Jun. 7, 2010

(65) Prior Publication Data

US 2010/0240430 A1    Sep. 23, 2010

Related U.S. Application Data

(63) Continuation of application No. 11/323,951, filed on Dec. 30, 2005, now Pat. No. 7,785,178.

(51) Int. Cl.
*A63F 9/24* (2006.01)
*A63F 13/00* (2006.01)
*G06F 17/00* (2006.01)
*G06F 19/00* (2011.01)

(52) U.S. Cl. .................... 463/6; 463/7; 463/31; 463/32; 463/33

(58) Field of Classification Search ........................ 463/6
See application file for complete search history.

(56) References Cited

U.S. PATENT DOCUMENTS

| 6,652,376 | B1 | 11/2003 | Yoshida |
| 2003/0003308 | A1 | 1/2003 | Kashiba et al. |
| 2004/0176936 | A1 | 9/2004 | Ohtsu |
| 2004/0224740 | A1 | 11/2004 | Ball |
| 2004/0266506 | A1 | 12/2004 | Herbrich |
| 2005/0264438 | A1 | 12/2005 | Fullerton |

*Primary Examiner* — Michael Cuff
*Assistant Examiner* — Kevin Y Kim

(57) ABSTRACT

A target speed profile for a specified racer is computed at various points along a track. The calculation is based on the real world physics of the racing environment and incorporates physical characteristics of the track, including curvature, undulation, and/or camber. A lateral acceleration component is developed to limit the realistic maximum speed a racer may obtain at any given point along the track. Furthermore, differences in realistic maximum speeds at different points along the track can overwhelm a racer's braking capability. As such, braking capacity adjustments can be applied to decrease the maximum speed in the target speed profile, so that the overall target speed profile is more realistic and attainable.

20 Claims, 5 Drawing Sheets

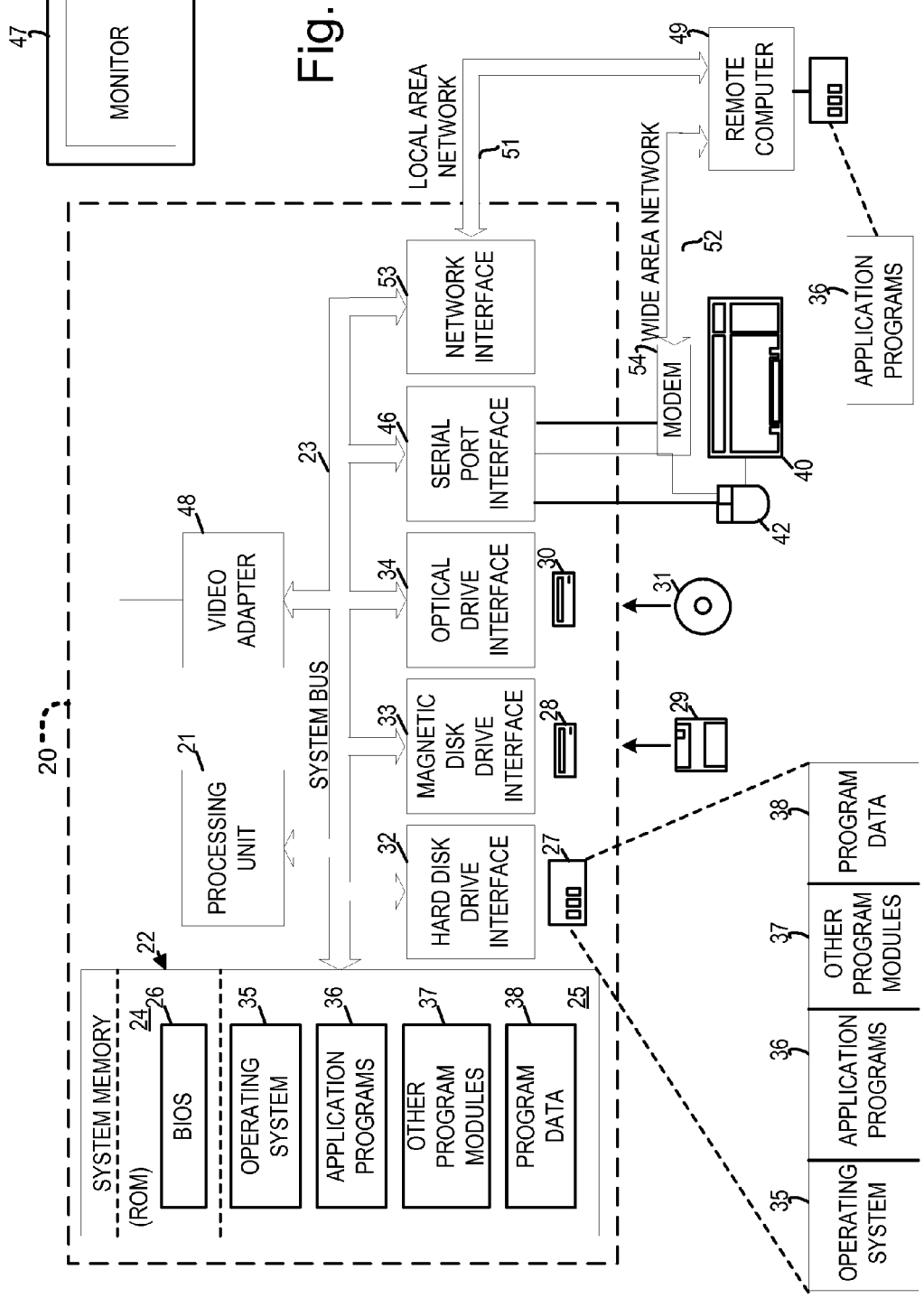

COMPUTING A TARGET SPEED IN A VIRTUAL RACING ENVIRONMENT

RELATED APPLICATIONS

The present application claims priority to, and incorporates by reference, U.S. patent application Ser. No. 11/323,951, filed Dec. 30, 2005.

BACKGROUND

In racing video games, such as on a desktop computer, video game console, or other system, a player typically maneuvers a racer along a track in a virtual environment. Exemplary racers may include race cars or other vehicles, player avatars, and other racing entities. Furthermore, racing typically includes a competitive characteristic, such as racing for speed or accuracy (e.g., through gates), jumping for distance, racing with fuel conservation goals, dogfighting, etc. Such competitive characteristics can challenge the player in controlling the racer along a path, such as a race track or other route.

In a racing game or vehicle simulation, realism is an important characteristic. As such, the artificial intelligence system of a racing game or simulation is used to control computer-controlled racers within the game. Likewise, the control system for each player-controlled racer manages how a player's racer performs on the track. However, existing racing simulation systems have taken shortcuts in controlling and/or managing such racers, thereby sacrificing realism in the player's game experience. One feature in which the sacrifice of realism is noticeable in the existing approaches is the performance of a player's racer or a computer controlled racer, particularly in the speed of the racers at various points along the track. For example, it is all too common that a computer-controlled racer achieves an unrealistic passing speed against a player's racer, significantly diminishing the player's enjoyment of the game.

SUMMARY

Implementations described and claimed herein address the foregoing problems by generating a target speed profile for a specified racer at various points along a track. The calculation is based on the real world physics of the racing environment and incorporates physical characteristics of the track, including curvature, undulation, and/or camber. A lateral acceleration component is developed to limit the realistic maximum speed a racer may obtain at any given point along the track. Furthermore, differences in realistic maximum speeds at different points along the track can overwhelm a racer's braking capability. As such, braking capacity adjustments can be applied to decrease the maximum speed in the target speed profile, so that the overall target speed profile is more realistic and attainable.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

FIG. 5 illustrates an exemplary system that may be useful in implementing the described technology.

DETAILED DESCRIPTIONS

Figure 1:
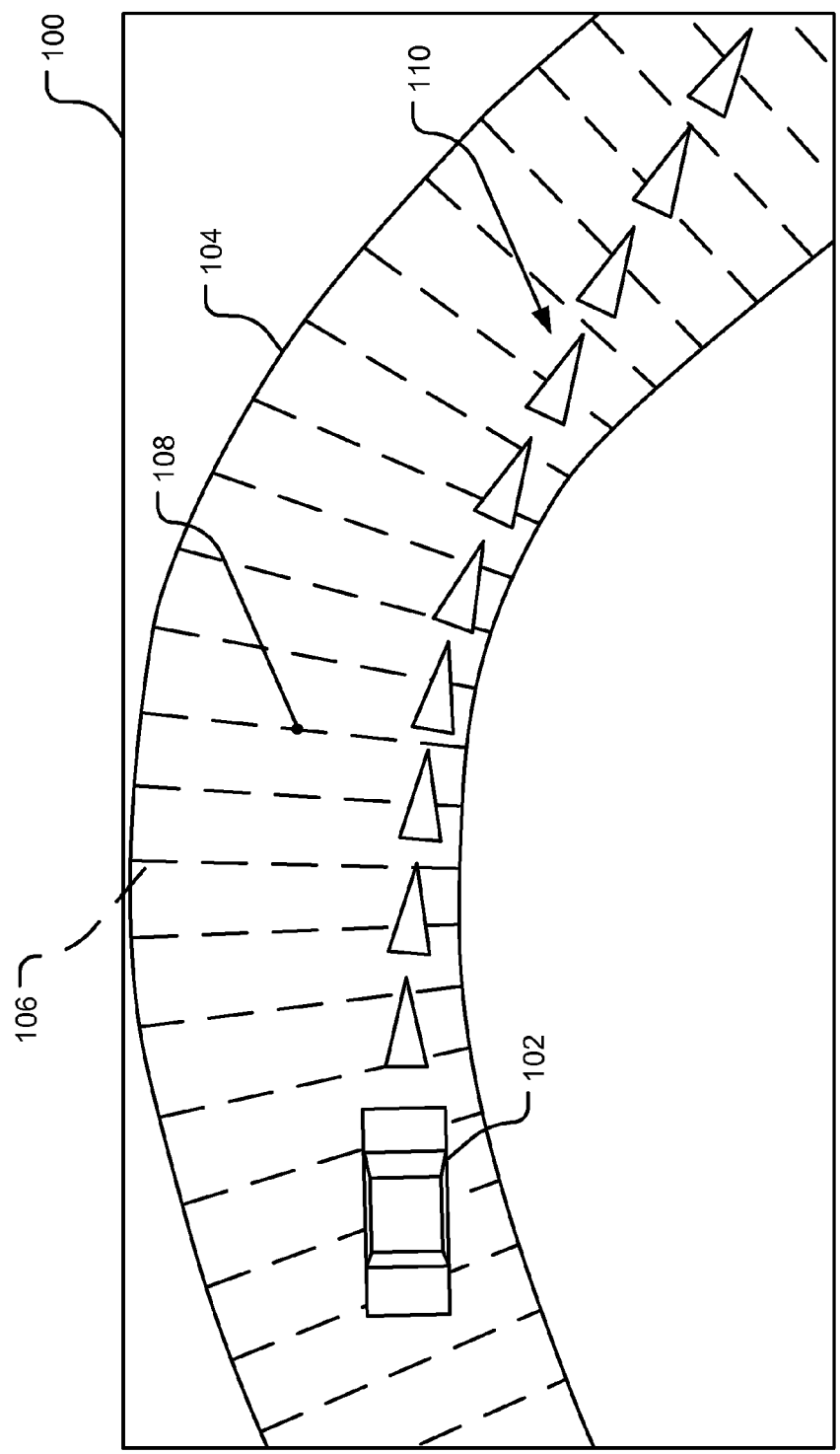
FIG. 1 illustrates a simulation schematic representation of a racer entering a turn along a track in an example video racing game.

FIG. 1 illustrates a simulation schematic representation 100 of a racer 102 entering a turn along a track or route 104 in an example video racing game. The track 104 is divided into segments, delineated by virtual waypoint lines (such as dashed line 106). Each virtual waypoint line passes through a waypoint (such as waypoint 108). In one implementation, these waypoints are located on a track center line, although they could be located elsewhere along the track, such as the right or left track boundary. An example virtual waypoint line is substantially perpendicular to the track centerline at the waypoint. The waypoints themselves are also virtual and are not generally displayed to the player, although both virtual waypoints and virtual waypoint lines may be displayed in some implementations. In one implementation, waypoints are evenly spaced along the center line at 2 meter intervals, although other distances may be employed. Waypoints may be designated with an index that can be referenced during game computations.

In FIG. 1, the racer 102 is illustrated as following a racing line 110. To control a computer-controlled racer along the racing line 110, the video racing game computes target speeds for the racer 102, relative to a waypoint along the track 104. A set of target speeds may be recorded in a speed profile in association with a racing line. The artificial intelligence system of the video game can then control the computer-controlled racer to approximate the target speeds in the speed profile along the racing line, subject to game play and physics simulation constraints. In an alternative implementation, the speed profile may be used to inform a player about suggested speeds or acceleration/deceleration along the track. For example, speed indicators along the track can indicate that a player should begin to slow down as his or her racer enters a curve. These speed indicators may be derived from the current game state and the target speed profile (e.g., the racer's current speed minus the target speed at one or more locations in front of the racer).

The maximum speed a racer can sustain around a curve in a track is influenced by various track configuration metrics, including curvatures of the racer's trajectory along the track and the camber of the track. In one implementation, curvature represents the rate of change in direction of the racer's trajectory relative to the distance the racer travels (e.g., in radians per meter). Examples of curvature may include "horizontal curvature" and "vertical curvature".

In FIG. 1, the racing line 110 shows a horizontal curvature, meaning a curvature in the plane of the track as observed perpendicularly from above (e.g., a right turn or left turn as the racer travels forward). Horizontal curvature can be computed at each waypoint and is represented by $\sigma_n$, where subscript n designates an index of the associated waypoint. In one implementation, horizontal curvature may be computed for a racing line using numerical techniques, although other methods may be used (e.g., manual measurement and assignment). Although curvature is strictly a signed quantity, the unsigned magnitude of the horizontal curvature is used ($|\sigma_n|$).

A racing line can also have vertical curvature, meaning a curvature normal to the plane of the track (e.g., an upward or downward slope as the racer travels forward). Vertical curvature, also referred to as "undulation", characterizes "up and down" changes along the racing line, such as going down a hill or cresting a hill. For example, when a racer crests a hill, it will go "light", losing some traction on the road surface. As such, maximum turning speed is diminished at the crest of the hill. In contrast, at the bottom of a hill, traction will improve. Undulation can be computed at each waypoint and is represented by $\alpha_n$, where subscript n designates an index of the associated waypoint. In one implementation, like horizontal curvature, undulation may be computed for a racing line using numerical techniques, although other methods may be used (e.g., manual measurement and assignment). Undulation is computed and applied as a signed quantity, such that the crest of a hill results in a negative value of $\alpha_n$.

Another environmental characteristic that can be considered when computing target speeds is the camber of the track, which represents the lateral slope of the track. A contribution of camber on a target speed computation is discussed with regard to FIG. 2.

Figure 2:
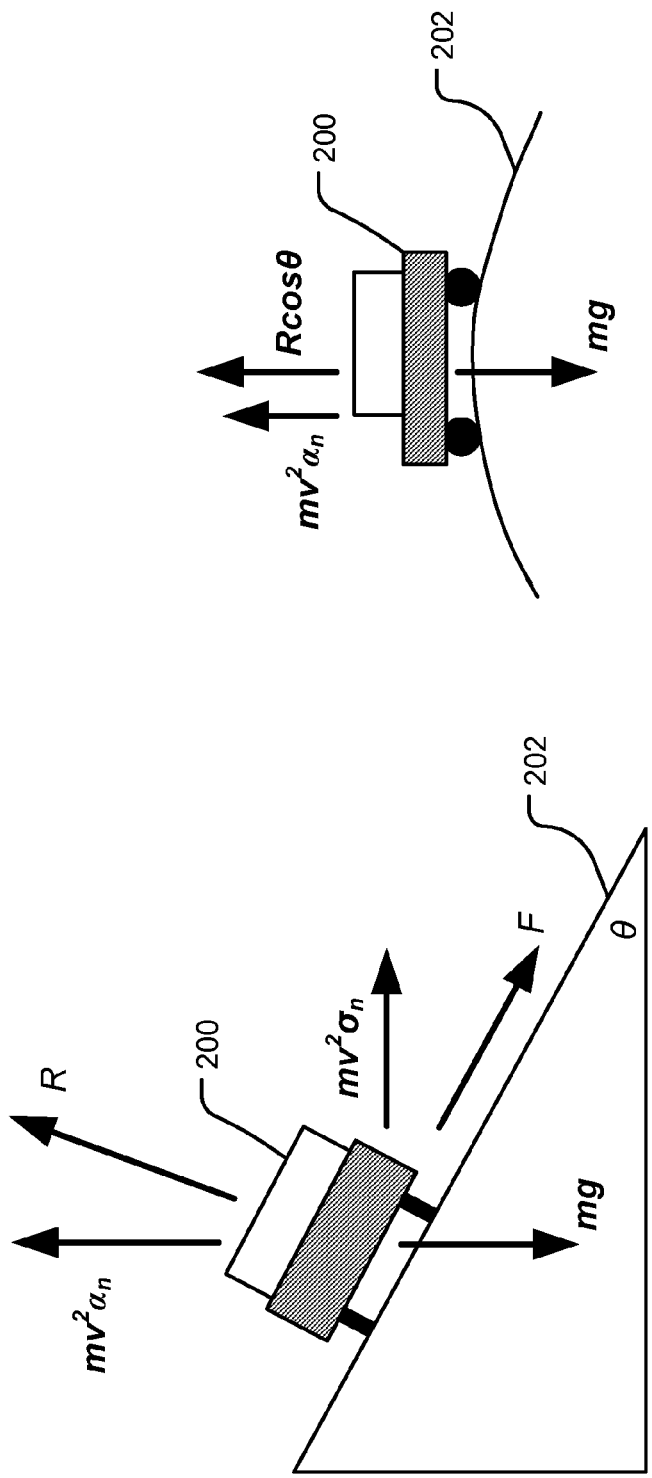
FIG. 2 illustrates representations of physical forces relative to an example racer and an example track.

FIG. 2 illustrates representations of physical forces relative to an example racer 200 and an example track 202. The mass of a car 200, which is an example of a racer, is represented by m. The car 200 is driving along a line with a horizontal curvature of $\sigma_n$ and a vertical curvature of $\alpha_n$. Example forces affecting the car 200 as it travels at velocity v while taking a right-hand curve along a cambered and undulating track 202 are shown in FIG. 2 and described below:

$mv^2|\sigma_n|$ represents a net horizontal force on the car, which causes the car to follow a line of horizontal curvature $\sigma_n$ $mv^2\alpha_n$ represents a net vertical force on the car, which causes the car to remain in contact with the undulating road of vertical curvature $\alpha_n$ mg represents gravitational force R represents the reaction force of the road surface as applied to the tires of the car F represents the lateral frictional force of the road surface as applied to the tires of the car θ represents the camber metric (e.g., an angle) of the track, where the sign of θ is measured such that θ>0, if the camber assists adherence to the road surface, and θ<0, if the camber hinders adherence to the road surface To remain on the undulating road surface, the net vertical force on the car equals $mv^2\alpha_n$, where:

$$R\cos\theta - mg - F\sin\theta = mv^2\alpha_n \quad (1)$$

$$R = \frac{mv^2\alpha_n + mg + F\sin\theta}{\cos\theta} \quad (2)$$

To prevent the car from skidding out of the turn around the horizontal curvature, the net lateral force on the car equals $mv^2|\sigma_n|$, where:

$$F\cos\theta + R\sin\theta = mv^2|\sigma_n| \quad (3)$$

By substituting for R from equation (2) into equation (3), the following equation results:

$$(mv^2\alpha_n + mg + F\sin\theta)\tan\theta + F\cos\theta = mv^2|\sigma_n| \quad (4)$$

By dividing through by m to convert to accelerations and rearranging to solve for v, the following equation results:

$$v^2 = \frac{g\sin\theta + K}{|\sigma_n|\cos\theta - \alpha_n\sin\theta} \quad (5)$$

where K=F/m and K represents the lateral acceleration that allows the car to take the curve without losing traction on the road surface. A value of K may be provided by the physics engine of the video game or simulation. The implied lateral acceleration K acting on the car results from the lateral frictional force between the car's tires and the road surface, which might be colloquially referred to as "grip".

Given equation (5), a maximum sustainable lateral acceleration metric $K_{max}$ represents a fixed limit beyond which the car's traction will be lost and the car will "skid". An approximate value of $K_{max}$ can be obtained from the physics simulations in the physics engine software of the gaming program. In one implementation, the value of $K_{max}$ can be set explicitly within the physics engine, although other implementations may compute a value of $K_{max}$ based on component forces acting on the racer (e.g., treating each tire independently and allowing body roll to influence the contact area of each tire, etc.). For example, in one implementation, an approximate value of K can be derived by applying the physics engine to simulate in advance the forces on a car that is traveling along a line of prototypical curvature until a loss of traction is measured. The average lateral acceleration of the car at the point of traction loss may be designated as a value of $K_{max}$.

In some systems, this $K_{max}$ value is speed-dependent because a car with significant downforce effects will exhibit greater grip at higher speeds. As illustrated by equation (5), speed increases monotonically with grip K. Therefore, the maximum speed sustainable by the car for a given track configuration at a waypoint is achieved when $K=K_{max}$, such that:

$$v_{max} = \sqrt{\frac{g\sin\theta + K_{max}}{|\sigma_n|\cos\theta - \alpha_n\sin\theta}} \quad (6)$$

An alternative implementation acknowledges that road camber and undulation both affect the force between the road and the tires (i.e., 'R'), which is also known as "load". Positive camber, for example, increases the downward force of the car on the road surface, which improves grip, increases the effective $K_{max}$, and helps the car travel faster through a turn without losing traction. Therefore, one approach to incorporating this effect (i.e., the effect of variable grip with load) into the maximum velocity computation is to approximate a load-dependent maximum lateral acceleration, which is designated by $\hat{K}_{m\hat{a}\hat{x}}$. In one implementation, a value of $\hat{K}_{m\hat{a}\hat{x}}$ can be obtained by a linear approximation, where $K_{max}$ is scaled by a ratio of the reaction force R and its counterpart on a flat road surface: mg. Therefore:

$$\hat{K}_{max} = K_{max} \frac{R}{mg} \quad (7)$$

By substituting $(K_{max}R)/g$ for F (since $F=\hat{K}_{max}m$) in equations (1) and (3) and collecting terms in R:

$$R\left(\cos\theta - \frac{K_{max}}{g}\sin\theta\right) - mg = mv^2\alpha_n \quad (8)$$

$$R\left(\frac{K_{max}}{g}\cos\theta + \sin\theta\right) = mv^2|\sigma_n| \quad (9)$$

Combining equations (8) and (9) and solving for R results in:

$$v_{max} = \sqrt{\frac{g\sin\theta + K_{max}\cos\theta}{|\sigma_n|\left(\cos\theta - \frac{K_{max}\sin\theta}{g}\right) - \alpha_n\left(\sin\theta + \frac{K_{max}\cos\theta}{g}\right)}} \quad (10)$$

However it is calculated, the value of $v_{max}$ represents an approximation of the maximum speed a racer can travel through any curvature or camber at a given waypoint on the track without losing traction. Ideally, $v_{max}$ can therefore represent a target speed, although other effects may impact the target speed, such as speed limits (e.g., in a pit area), physical limits of the racer (e.g., insufficient engine power, friction, drag, damage, etc.), and other effects. Nevertheless, the target speeds at each waypoint can be combined in sequence to provide a target speed profile for the track and the racer.

Figure 3:
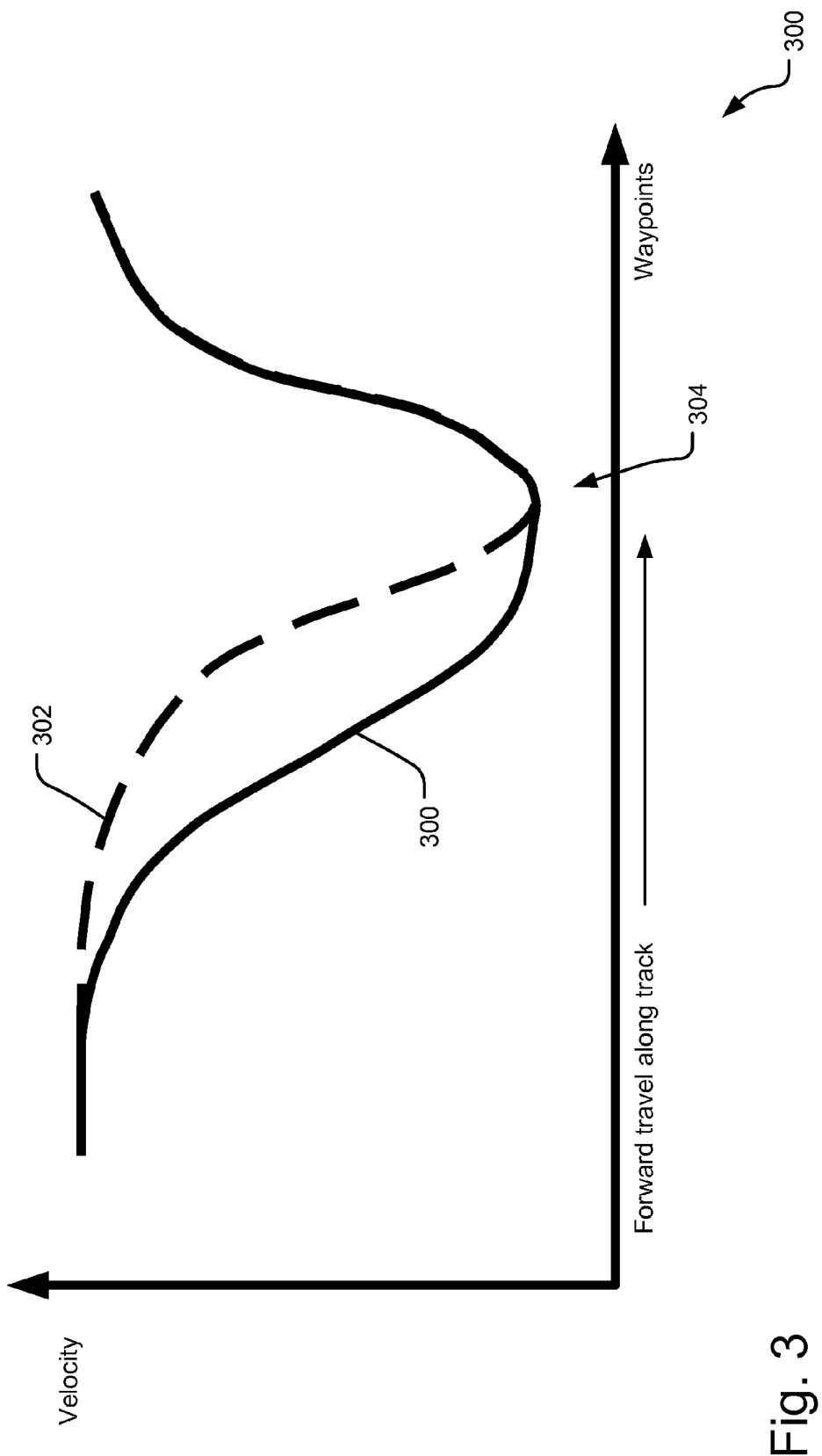
FIG. 3 illustrates an example effect of braking capacity adjustments on a speed profile.

FIG. 3 illustrates an example effect of braking capacity adjustments on a speed profile 300. The target speeds computed by equation (10), for example, (ignoring any other effects) represent instantaneous maximum speeds (i.e., independent of speeds at any other waypoint). As such, a racer's acceleration or braking capacity is not considered from one waypoint to the next. However, it should be understood that it is possible that horizontal and vertical curvature and track camber can result in maximum speeds at two different waypoints that a given racer cannot achieve given the distance between those waypoints. For example, the racer may be unable to accelerate or brake fast enough between two waypoints to attain the instantaneous maximum speeds designated for both way points.

Acceleration capacity limitations are of little concern, as a racer's failure to achieve a maximum allowable speed under a given track condition is a common occurrence during game play—the racer just travels slower than is physically possible for the track. However, deceleration capacity limitations are another matter because a racer may be unable to slow from a very fast target speed to a very slow target speed in the distance between two given waypoints, thereby resulting in a loss of traction in a curve, for example. In other words, a racer may just be mechanically unable to brake fast enough to match the target speed at an ensuing waypoint.

In one implementation, however, the braking capacity of a racer may be considered. Given a speed profile 302 of initial target speeds (e.g., as computed using equations (6) or (10), ignoring other effects), the target speed profile may be altered to accommodate a limited braking capacity of a racer to yield a more achievable speed profile 300, thereby allowing the racer to meet the target speed at point 304 in the track, given its limited braking capacity.

To this end, the physics engine of the simulation can provide an approximate "maximum longitudinal deceleration" factor $B_{max}$. Given this factor, the initial speed profile 302 can be "corrected" for limited braking capacity of the racer by cycling through the initial target speeds and altering any target speed differences between two waypoints that exceed this maximum longitudinal deceleration factor. A value of $B_{max}$ may be computed through simulation by the physics engine, similar to an example computation of $K_{max}$, using increasing longitudinal deceleration forces until a loss of traction is measured.

In one implementation, a braking capacity adjustment module cycles though each waypoint, considering the initial target speed for that base waypoint and looking ahead (or behind) for a number of waypoints (e.g., Lookahead=100 waypoints). The module examines the target speed at each waypoint in the Lookahead distance, extending from the base waypoint. For each waypoint n in the Lookahead distance, the module determines the slowest speed the racer can achieve from the previous waypoint n−1 at a maximum braking. For example, $MinSpeed_{n-1}$ is initialized to the initial target speed at the current waypoint and, for each waypoint n within the Lookahead distance:

$$MinSpeed_n = MinSpeed_{n-1} - \left(\frac{MetersBetweenWaypoints}{MinSpeed_{n-1}}\right)B_{max} \quad (11)$$

If $MinSpeed_n$ exceeds the initial target speed at waypoint n, the difference is recorded, if it exceeds any previous difference in the Lookahead distance from the base waypoint. As such, the maximum overshoot detected during the Lookahead distance from the base waypoint is tracked and recorded. After the initial target speeds in the Lookahead distance have been examined, the maximum overshoot is subtracted from the initial target speed at the base waypoint, thereby applying the braking capacity correction to the target speed at that waypoint. Thereafter, the base waypoint is incremented to the next waypoint, the maximum overshoot is reset to zero, $MinSpeed_{n-1}$ is initialized to the initial target speed at the new base waypoint, and the initial target speeds in the Lookahead distance from the new base waypoint are evaluated as described above. As a result, the initial speed profile 302 is adjusted to the speed profile 300 to accommodate braking capacity limitations of the racer.

Figure 4:
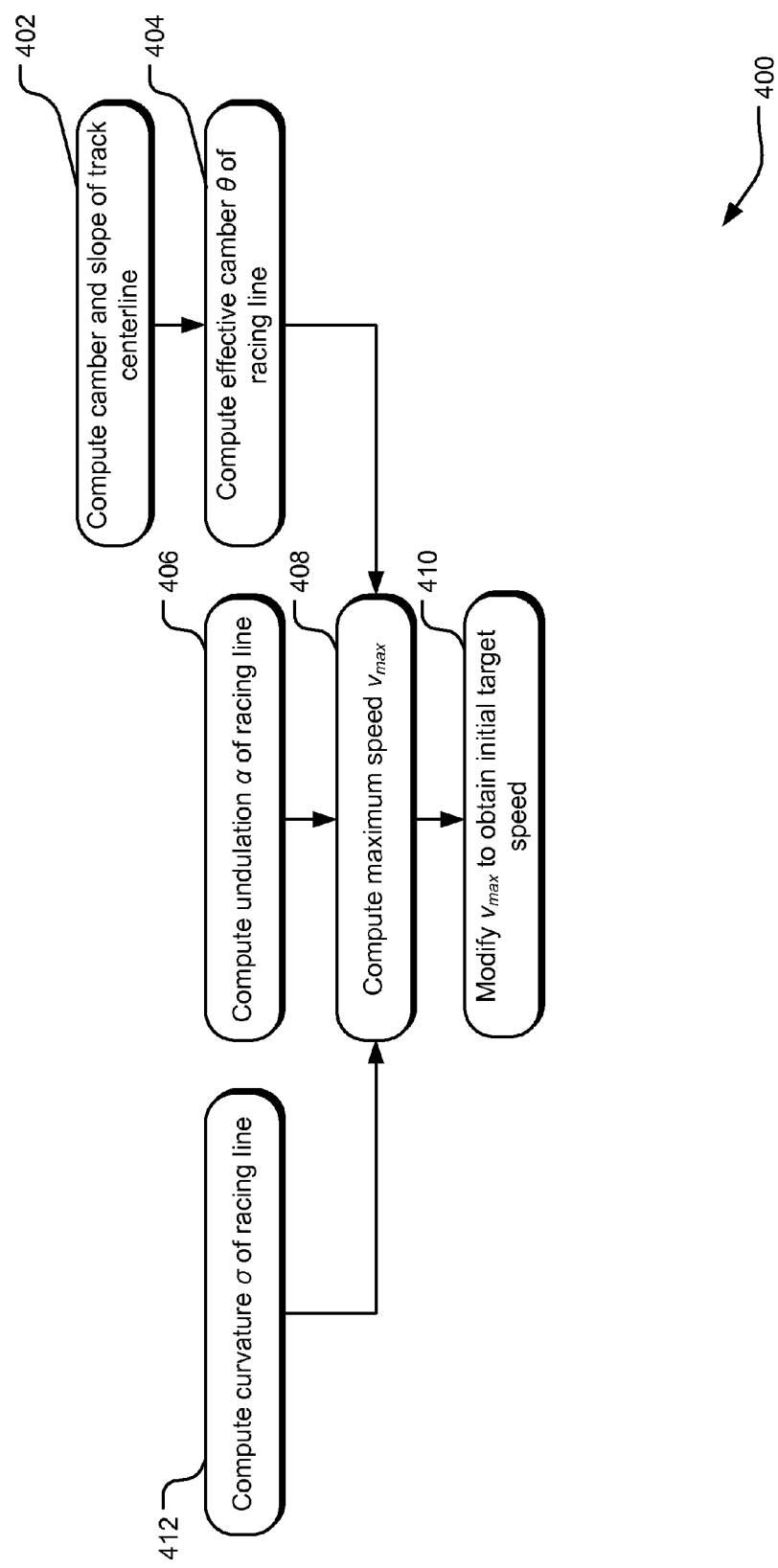
FIG. 4 illustrates example operations for computing a maximum speed of a racer at an individual waypoint along a track.

FIG. 4 illustrates example operations 400 for computing a maximum speed of a racer at an individual waypoint along a track. In one implementation, operations 400 are performed for each waypoint n on a track. Inputs to the operation 400 include track geometry (e.g., a mathematical representation of the track) and a determined racing line along the track. Other example inputs may include a maximum lateral acceleration $K_{max}$ for the racer, and other limitation effects (e.g., an enforced lower speed limit in the pits, etc.).

A computing operation 402 computes the camber and slope on the track centerline at waypoint n, where camber in this operation represents the lateral angle of the track at the centerline and slope represents the longitudinal angle of the track at the centerline. In one implementation, camber can be calculated as the vector between the intersection of the waypoint line with the left side of the track and the intersection of the waypoint line with the right side of the track. Likewise, slope can be calculated as the vector between the previous waypoint and the subsequent waypoint. Other computations may be employed to compute the camber and slope on the track, including reading explicit camber and slope values from data storage.

Another computing operation 404 computes the effective camber θ of the racing line, which specifies the camber at an intersection of a specific racing line and a waypoint line (rather than strictly a center line). In one implementation, the effective camber θ is computed as a function of the longitudinal slope vector, the lateral camber vector, and the racing line vector of the racer using geometric calculations. As effective camber θ is computed for each waypoint line, it may be indexed using the subscript n variable, such that effective camber θn represents the effective camber at the current racing line at waypoint line n.

Another computing operation 406 computes the vertical curvature $\alpha_n$ of the racing line. In one implementation, the vertical curvature $\alpha_n$ may be approximated using the following:

$$\alpha_n \approx \frac{z_{n+1} - 2z_n + z_{n-1}}{\Delta^2} \quad (12)$$

where $(x_n, y_n, z_n)$ represents a location on the current waypoint line, $(x_{n-1}, y_{n-1}, z_{n-1})$ represents a location on the previous waypoint line, $(x_{n+1}, y_{n+1}, z_{n+1})$ represents a location on the next waypoint line, and $\Delta$ represents the spacing between waypoints.

Yet another computing operation 412 computes the horizontal curvature $\sigma_n$ of the racing line. In one implementation, the horizontal curvature $\sigma_n$ may be approximated using the following:

$$\sigma_n \approx \frac{(y_{n+1} - 2y_n + y_{n-1})(x_{n+1} - x_{n-1}) - (x_{n+1} - 2x_n + x_{n-1})(y_{n+1} - y_{n-1})}{2\Delta^3} \quad (13)$$

where $(x_n, y_n, z_n)$ represents a location on the current waypoint line, $(x_{n-1}, y_{n-1}, z_{n-1})$ represents a location on the previous waypoint line, $(x_{n+1}, y_{n+1}, z_{n+1})$ represents a location on the next waypoint line, and $\Delta$ represents the spacing between waypoints.

A computing operation 408 computes a maximum velocity $v_{max}$, such as by applying equation (6), equation (10), or another maximum velocity equation. The maximum lateral acceleration value $K_{max}$ may be applied here, as well as other limitations, such as tentative cornering reductions that artificially reduce the $K_{max}$ from its inherent value for a given racer. A limiting operation 410 applies other speed limits, such as a speed limit in the pits, to produce an initial target speed for the waypoint n. The example operations 400 are repeated for each waypoint along the track to produce an initial target speed profile, which can be recorded in a storage medium, such as memory, for access during the simulation when controlling computer-controlled racers, for example.

If braking capacity limitations are considered, the initial target speed profile may be altered to correct target speeds where they would prevent adequate slowing at some distance in front of the racer. One implementation of braking capacity adjustments is described with regard to FIG. 4, although other implementations may also be employed, including a backwards cycling through waypoints, etc. Such braking capacity adjustments may be applied to speeds in the initial target speed profile to provide a resulting target speed profile, which can also be stored in a storage medium, such as memory.

The exemplary hardware and operating environment of FIG. 5 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a braking capacity module, a curvature computation module, an undulation computation module, a camber computation module, a maximum speed module, and other modules may be embodied by instructions stored in memory 22 and/or storage devices 29 or 31 and processed by the processing unit 21. Racing line parameters, track geometry data, maximum lateral acceleration values, maximum longitudinal deceleration factors, and other data may be stored in memory 22 and/or storage devices 29 or 31.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method, performed by a computing device comprising a processor, storage, and a display, of setting a target speed for a racer in a virtual racing environment implemented by the computing device, the virtual racing environment rendering graphics for display by the computing device, the racer displayed by the virtual racing environment on the display, the method comprising:
   obtaining a track configuration metric corresponding to at least a curvature or camber of the track and storing the track configuration metric in the storage;
   determining, by computations of the processor, a maximum lateral acceleration metric associated with the racer;
   computing, by computations of the processor, the target speed as a function of the maximum lateral acceleration metric and the track configuration metric;
   recording the target speed in the storage; and
   while performing a simulation in the virtual racing environment of the racer moving on the track at a current speed, displaying on the display a speed or acceleration indicator based on the target speed.

2. A method according to claim 1, wherein the speed indicator indicates whether the player should slow down based on the target speed and based on a current state of the simulation.

3. A method according to claim 2, wherein the current state of the simulation comprises the current speed of the racer.

4. A method according to claim 1, further comprising accessing a plurality of waypoint lines that intersect a line along the track, one of the waypoint lines corresponding to the curvature or camber of the track used to compute the target speed.

5. A method according to claim 4, further comprising computing additional target speeds at respective waypoint lines according to various respective cambers or curvatures of the track, and as the racer moves along the track changing the speed indicator according to the target speeds.

6. A method according to claim 1, wherein the maximum lateral acceleration metric represents a maximum lateral acceleration that allows the racer to travel on the track without losing traction on a road surface in the virtual racing environment.

7. A method according to claim 1, further comprising:
   adjusting the target speed based on a braking capacity of the racer.

8. A method according to claim 1, further comprising:
   computing a minimum attainable speed based on a braking capacity of the racer; and
   adjusting the target speed based on the target speed and the minimum attainable speed.

9. A computer-readable storage medium having computer-executable instructions that cause a computing device to perform a process that sets a target speed of a waypoint line for a racer in a virtual racing environment executed by the computing device, wherein the computer-readable storage is not a signal, and wherein a racing line is defined by positions corresponding to a series of waypoint lines of a race course of the virtual racing environment, the process comprising:

determining a maximum lateral acceleration metric associated with the racer;

computing, by the virtual racing environment, the target speed of the waypoint line as a function of the maximum lateral acceleration metric and as a function of either or both a camber angle metric and/or a curvature metric of the race course at the waypoint line;

recording the target speed of the waypoint line in a storage medium; and based on the target speed, displaying information indicating suggested speed or suggested acceleration or suggested deceleration.

10. A computer-readable storage medium according to claim 9, wherein the displaying is further based on a current speed of the racer, and the suggested speed or suggested acceleration or suggested deceleration is relative to the current speed of the racer.

11. A computer-readable storage medium according to claim 9, wherein the target speed corresponds to a part of the track that is in front of the racer when the displaying is performed.

12. A computer-readable storage medium according to claim 11, wherein the displayed information reflects a difference between a current speed of the racer and the target speed of the part of the track that is in front of the racer.

13. A computer-readable storage medium according to claim 9, wherein the maximum lateral acceleration metric represents a maximum lateral acceleration that allows the racer to travel through the waypoint line without sliding in the virtual racing environment.

14. A computer-readable storage medium according to claim 9, wherein the process further comprises:

adjusting the target speed based on a braking capacity of the racer.

15. A method of evaluating speed in a racing simulation executed by a computing device comprising a processor, storage, and a display, the method comprising:

computing, by the processor, a plurality of target speeds for a racer of the racing simulation and a race track of the racing simulation, the race track comprising a model stored in the storage, the target speeds being computed based on one or more lateral acceleration values, and based on one or more curvatures and/or cambers of the track of respective one or more parts of the track;

storing the target speeds in the storage; and while simulating, by the processor, the racer racing on the track with a current speed, displaying on the display speed indicators that, according to the target speeds, suggest increasing or decreasing speed of the racer.

16. A method according to claim 15, wherein the speed indicators are also displayed according to values of the current speed of the racer, such that a given speed indicator is displayed according to a given current speed value and a given target speed.

17. A method according to claim 15, wherein the target speeds correspond to waypoint lines.

18. A method according to claim 15, wherein the target speeds are computed based further on braking capacity of the racer.

19. A method according to claim 15, wherein a plurality of lateral accelerations are computed.

20. A method according to claim 15, wherein a current displayed speed indicator indicates whether to increase or decrease speed based on the current speed of the racer and based on a target speed corresponding to a part of the track that is in front of the racer.

* * * * *